United States Patent
Berry et al.

(10) Patent No.: US 8,653,798 B2
(45) Date of Patent: Feb. 18, 2014

(54) GENERATOR ROTOR AND BLEED RESISTOR ASSEMBLY

(75) Inventors: Nathan A. Berry, Rockford, IL (US); Philip Gillingwater, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 517 days.

(21) Appl. No.: 13/050,997

(22) Filed: Mar. 18, 2011

(65) Prior Publication Data

US 2012/0235648 A1    Sep. 20, 2012

(51) Int. Cl.
*H02K 16/00* (2006.01)

(52) U.S. Cl.
USPC ................................ 322/89; 322/1

(58) Field of Classification Search
USPC .......................... 322/1, 37, 89, 91
See application file for complete search history.

(56) References Cited

U.S. PATENT DOCUMENTS

| | | | |
|---|---|---|---|
| 4,046,445 A | 9/1977 | Anhalt | |
| 4,862,342 A | 8/1989 | Dhyanchand et al. | |
| 5,012,177 A | 4/1991 | Dhyanchand et al. | |
| 5,430,362 A * | 7/1995 | Carr et al. | 318/779 |
| 5,550,456 A | 8/1996 | Shekhawat et al. | |
| 5,903,130 A | 5/1999 | Rice et al. | |
| 5,986,438 A * | 11/1999 | Wallace et al. | 322/20 |
| 6,037,752 A | 3/2000 | Glennon | |
| 6,191,562 B1 | 2/2001 | Mueller et al. | |
| 6,232,691 B1 | 5/2001 | Anderson | |
| 6,462,429 B1 | 10/2002 | Dhyanchand et al. | |
| 6,850,043 B1 | 2/2005 | Maddali | |
| 6,909,263 B2 * | 6/2005 | Xu et al. | 322/29 |
| 6,998,726 B2 * | 2/2006 | Sarlioglu et al. | 290/31 |
| 7,459,889 B2 | 12/2008 | Ganev et al. | |
| 8,432,051 B2 * | 4/2013 | Madawala | 290/44 |

FOREIGN PATENT DOCUMENTS

JP    2010-251175 A    11/2010

* cited by examiner

*Primary Examiner* — Nicholas Ponomarenko
(74) *Attorney, Agent, or Firm* — Carlson, Gaskey & Olds P.C.

(57) ABSTRACT

A generator includes a rotor structure has a rotor frame that supports a rotor circuit. The rotor frame is electrically connected to the rotor circuit via a resistive element.

16 Claims, 3 Drawing Sheets

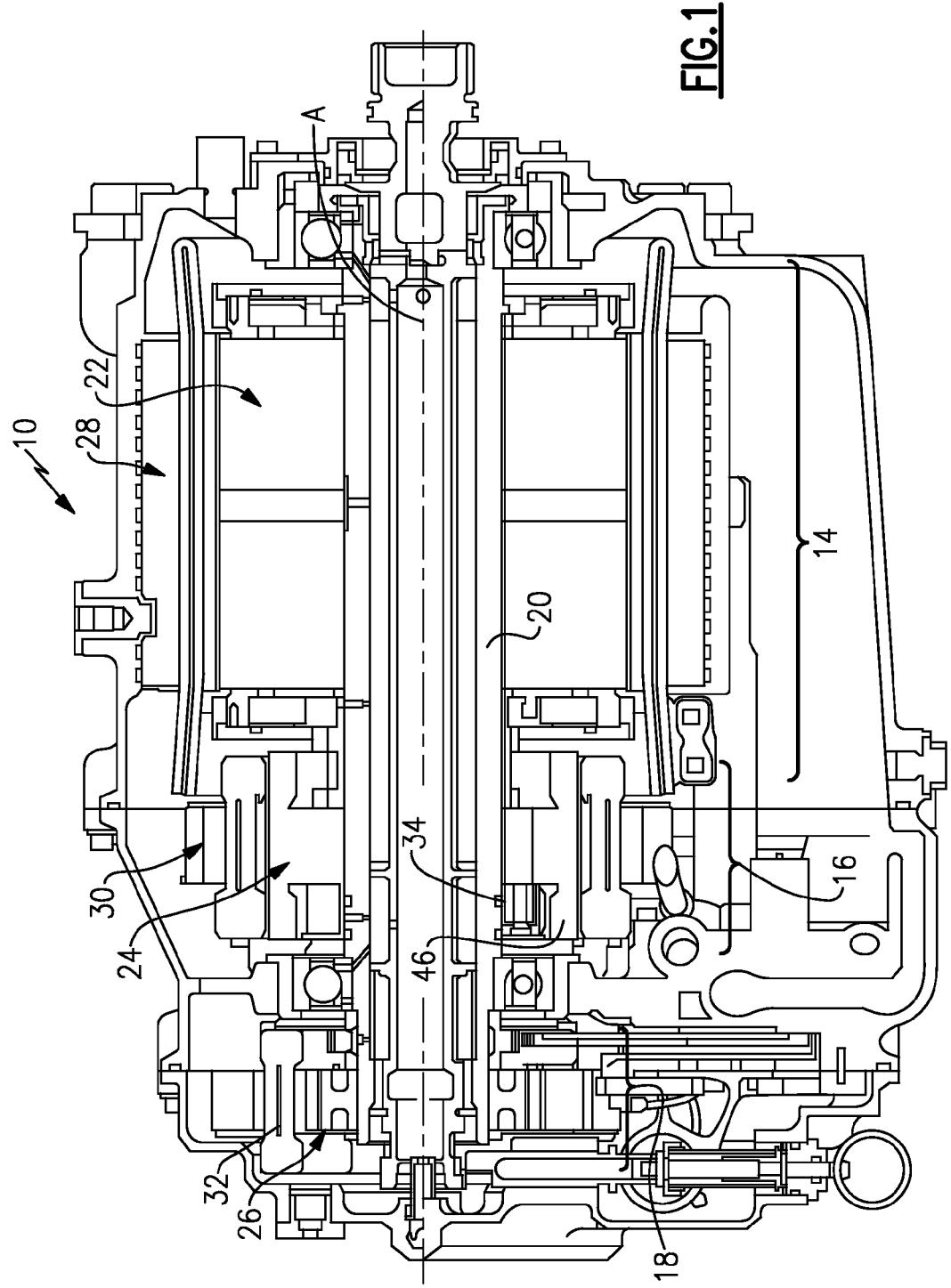

GENERATOR ROTOR AND BLEED RESISTOR ASSEMBLY

BACKGROUND

This disclosure relates to a generator rotor and its rotor circuit.

A generator includes a stator fixed relative to a housing and a rotor rotatable about an axis relative to the stator. The rotor includes a rotor frame carrying a rotor circuit that includes field turns and a rectifier assembly, which has diodes. Rotation of the rotor relative to the exciter field (stator) induces an alternating current in the exciter armature (rotor) turns, which is converted to a DC voltage by the rectifier assembly.

Generators can experience rectifier assembly failures due to damaged diodes. One failure mode results from an electrostatic discharge event between the rotor frame and the isolated rotor circuit. The rotor circuit is electrically insulated from the rotor frame. The isolation of the rotor circuit can result in a build up of a high voltage potential on the rotor circuit relative to the rotor frame under common operational parameters. The voltage potential built up within the isolated rotor circuit discharges to the rotor frame when the voltage potential exceeds an insulation rating of the rotor frame. The voltage discharge can result in a voltage across the diodes in the rotor circuit that exceeds the diode voltage rating. This sudden voltage across the diodes results in a reverse bias on each diode. The reverse bias causes diode break down and shorting when the voltage exceeds the diode voltage rating, thus damaging the rectifier assembly.

SUMMARY

Disclosed is a generator having a rotor structure. The rotor structure has a rotor frame supporting an isolated rotor circuit having field turns, a rectifier assembly, and a first and second bus bar electrically coupled to the rectifier assembly such that the first bus bar is a positive voltage bus bar and the second bus bar is a negative voltage bus bar. The generator additionally has a resistive element electrically connecting the rotor circuit to the rotor frame.

Also disclosed is a method for preventing an arc discharge within a generator rotor having the step of transferring voltage potential from a higher voltage potential component to a lower voltage potential component over a resistive element.

These and other features of the disclosure can be best understood from the following specification and drawings, the following of which is a brief description.

BRIEF DESCRIPTION OF THE DRAWINGS

FIG. 1 is a cross-sectional view of a generator.

DETAILED DESCRIPTION

Figure 2A:
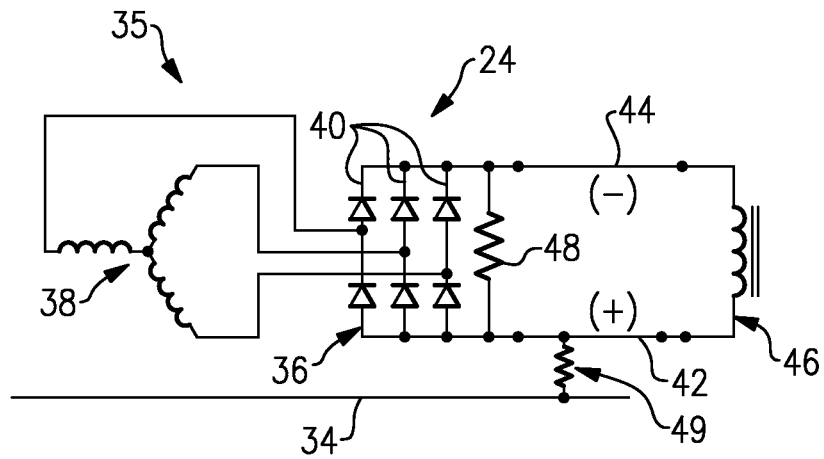
FIG. 2A is a first schematic of a rotor for the generator shown in FIG. 1.
Figure 2B:
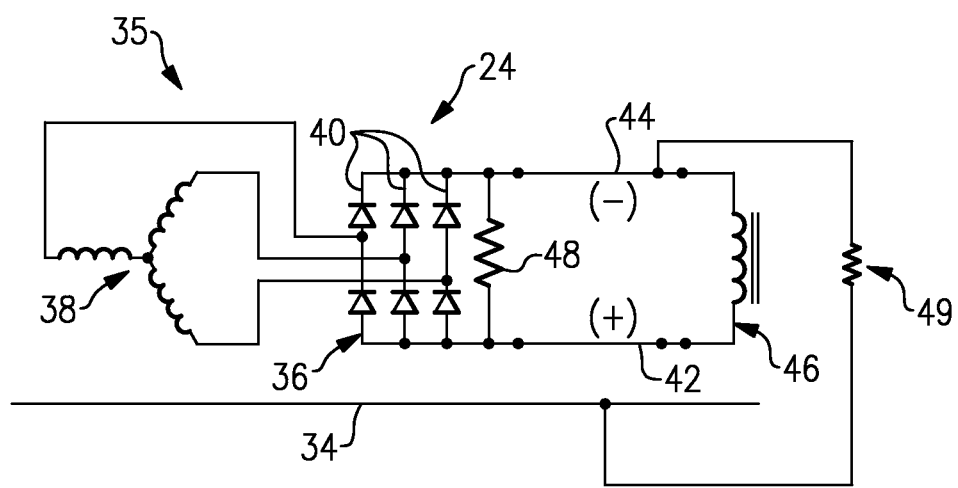
FIG. 2B is a second schematic of a rotor for the generator shown in FIG. 1.
Figure 2C:
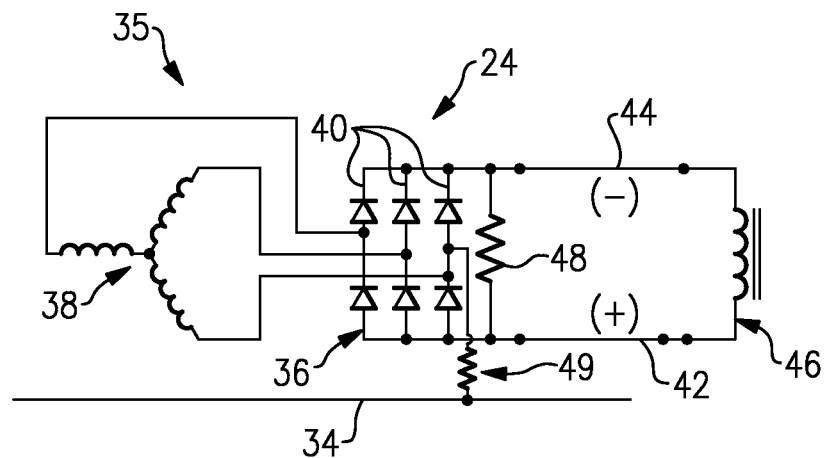
FIG. 2C is a third schematic of a rotor for the generator shown in FIG. 1.

A generator 10, shown in FIG. 1, is of the kind typically used in aerospace applications. The generator 10 includes main, exciter and permanent magnet generator (PMG) assemblies 14, 16, 18. In one example, the main, exciter and PMG assemblies 14, 16, 18 respectively included first, second (exciter) and third rotors 22, 24, 26 carried on a common shaft 20 rotatable about an axis A. During rotation, the first, second and third rotors 22, 24, 26 respectively cooperate with first, second and third stators 28, 30, 32 to induce an alternating current in each of the main, exciter and PMG assemblies 14, 16, 18.

The exciter rotor 24 is schematically illustrated in FIGS. 2A, 2B, 2C and 2D. The exciter rotor 24 includes a rotor frame 34 that supports a rotor circuit 35. The exciter armature turns 38 in the rotor circuit 35 induce an alternating current that passes through a rectifier assembly 36. Diodes 40 in the rectifier assembly 36 rectify the alternating current to provide a DC voltage. Positive and negative bus bars 42, 44 from the rectifier assembly 36 supply the DC voltage to energize main field turns 46. A suppression resistor 48 is connected across the positive and negative bus bars 42, 44 parallel to the main field turns 46, and serves to suppress voltage spikes that occur when the rotor circuit 35 is turned off and when the Diodes 40 turn on or off. Rotation of the exciter rotor 24 induces an alternating current in the stator 30. The rotor frame 34 is connected to the rotor circuit 35 via a resistive element 49.

Figure 2D:
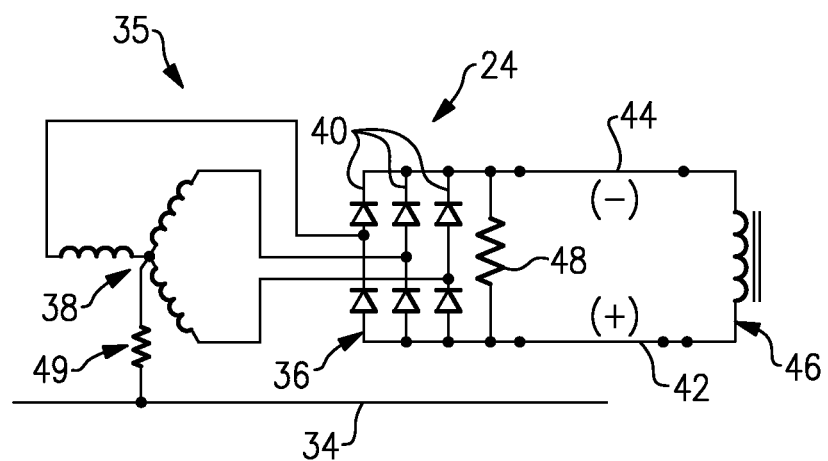
FIG. 2D is a fourth schematic of a rotor for the generator shown in FIG. 1.

As can be seen in FIGS. 2A-2D, the resistive element 49 can be connected to the positive DC bus bar 42 (FIG. 2A), the negative DC bus bar 44 (FIG. 2B), the connection between exciter and rectifier diodes 40 (FIG. 2C), or the exciter armature turns 38 (FIG. 2D). Alternately, the resistive element 49 can be connected to any electrically conductive portion of the rotor circuit 35 and provide a similar functionality. The resistive element 49 allows a current flow between the rotor circuit 35 and the rotor frame 34. Current flow between the rotor circuit 35 and the rotor frame 34 forces a voltage buildup in one of the rotor circuit 35 and the rotor frame 34 to be distributed to the other of the rotor circuit 35 and the rotor frame 34 in a controlled and constant manner, thereby preventing sudden voltage discharges. The current flow further causes the rotor circuit 35 to be constantly at a voltage potential offset from the rotor frame 34.

The resistive element 49 causes the voltage potential of the rotor circuit 35 to be offset from the voltage potential of the rotor frame 34 by allowing potential from the rotor circuit 35 or the rotor frame 34 having a higher potential to bleed across to the other of the rotor circuit 35 or the rotor frame 43, having a lower potential. The resistive element 49 reduces a voltage potential disparity between the rotor circuit 35 and the rotor frame 34 by dissipating a portion of the voltage potential bled across the resistive element 49, and enables the rotor circuit 35 to have a voltage potential offset from the rotor frame 34 by a steady amount. The difference between the voltage potentials of the rotor circuit 35 and the rotor frame 34 is determined by the resistance of the resistive element 49.

The resistive element 49 is illustrated in the drawings as being a resistor, however in practice the resistive element 49 can be any electrical component which impedes current and has a greater resistivity than a standard electrical connection. As an alternate example an active resistor coupled to a controller controlling the resistance of the active resistor can be used to the same effect.

Although example embodiments have been disclosed, a worker of ordinary skill in this art would recognize that certain modifications would come within the scope of the claims. For that reason, the following claims should be studied to determine their true scope and content.

What is claimed is:

1. A generator comprising:
a rotor structure having a rotor frame supporting an isolated rotor circuit having exciter armature turns, a rectifier assembly, and a first and second bus bar electrically coupled to said rectifier assembly such that said first bus bar is a positive voltage bus bar and said second bus bar is a negative voltage bus bar; and a resistive element electrically connecting said rotor circuit to said rotor frame.

2. The generator according to claim 1, wherein the rectifier assembly includes multiple diodes configured to convert an alternating current to a direct current.

3. The generator according to claim 1, comprising exciter armature turns electrically connected to the rectifier assembly and configured to energize the rectifier assembly.

4. The generator according to claim 1, comprising a stator within which a rotor is disposed for rotation about an axis, the rotor including the rotor structure, the rotor configured to induce an alternating current in the stator, and the resistive element configured to pass a current from one of said exciter armature turns, said rectifier assembly, said first bus bar and said second bus bar to the rotor frame.

5. The generator according to claim 1, wherein said resistive element electrically couples said exciter armature field turns to said rotor frame.

6. The generator according to claim 1, wherein said resistive element electrically couples said rectifier assembly to said rotor frame.

7. The generator according to claim 6, wherein said resistive element is connected to said rectifier assembly between an exciter and a plurality of rectifier diodes.

8. The generator according to claim 1, wherein said resistive element electrically couples said first bus bar to said rotor frame.

9. The generator according to claim 1, wherein said resistive element electrically couples said second bus bar to said rotor frame.

10. The generator according to claim 1, wherein said resistive element comprises a passive resistor.

11. The generator according to claim 1, wherein said resistive element comprises an active resistor.

12. The generator according to claim 11, wherein said resistive element is coupled to an active resistor controller.

13. A method for preventing an arc discharge within a generator rotor comprising the step of:
    transferring voltage potential from one of a rotor frame and a rotor circuit to the other of said rotor frame and said rotor circuit over a resistive element.

14. The method according to claim 13, further comprising the step of dissipating at least a portion of the transferred voltage potential within said resistive element, thereby ensuring that said rotor circuit maintains voltage potential offset from a voltage potential of said rotor frame.

15. The method according to claim 14, wherein said resistive element connects said rotor frame to said rotor circuit.

16. The method according to claim 14, wherein said resistive element is an active resistor and further comprising the step of controlling an amount of voltage potential dissipated in said resistive element by controlling a resistance of said active resistor.

* * * * *